May 23, 1939.　　　　J. F. TRITLE　　　　2,159,773

CONTROL SYSTEM

Filed May 22, 1935

Inventor:
John F. Tritle,
by Harry E. Dunkan
His Attorney.

Patented May 23, 1939

2,159,773

UNITED STATES PATENT OFFICE 2,159,773

CONTROL SYSTEM

John F. Tritle, Erie, Pa., assignor to General Electric Company, a corporation of New York Application May 22, 1935, Serial No. 22,745

38 Claims. (Cl. 172—179)

My invention relates to control systems, more particularly to motor control systems for vehicles which are capable of maintaining high schedule speeds with frequent starting and stopping of the vehicle, and has for an object the provision of a simple, reliable and economical system of this character.

When a vehicle or train is operating between stations located fairly near to each other, it is necessary in order to obtain a high schedule speed, i. e., a high average speed over a run which requires frequent starting and stopping, to accelerate the vehicle or train as quickly as possible to its maximum speed and to bring the train to a standstill at the next station in the minimum amount of time. In a typical case the train may be accelerated from standstill to a speed of forty miles per hour in approximately fourteen seconds. After attaining this speed the train may coast for approximately thirty-two seconds, the speed decreasing only a slight amount before it is braked to a standstill, the braking time requiring but approximately six-and one-half seconds. It will, therefore, be apparent that there is little opportunity for slow acting relays or complicated control apparatus to function. On the other hand, with these high rates of acceleration and retardation of the order of four miles per hour per second, it is essential in order to avoid discomfort to the passengers to provide an extremely smooth operation of the train, i. e., the passengers must not experience jerks or otherwise be aware of uneven changes in either torque or braking effort.

In carrying out my invention in one form thereof I provide for the acceleration of a plurality of motors by connecting them first in series and then in parallel circuit relation and by rapidly decreasing the series resistance connected in the respective circuits. The transition from the series to the parallel circuit is accomplished without interrupting either the flow of current or changing materially the motor torque during the transition period. More specifically, I employ the bridge method of transition, as described and claimed in my Patent No. 1,434,758, dated November 7, 1922, and predetermine in accordance with the motor current or accelerating rate the value of resistance included in circuit with the motors at the instant they are connected in parallel which will insure a minimum, if not entirely prevent, change in the motor torque during the transition period.

In a further aspect of my invention I initiate and complete the acceleration of the motors to full speed operation with a substantially reduced field excitation and I employ a main controller operable at a speed dependent upon the rate of acceleration of the motors or vehicle to control both the field excitation and the motor current.

After the motors have been connected in parallel, provision is made for the operation of the main controller to reconnect resistance into the circuit and to reconnect the motors in series. In this manner the train or vehicle speed can be adjusted without the use of brakes to meet the variable traffic conditions which may be encountered in metropolitan areas.

For a more complete understanding of my invention reference should now be had to the accompanying drawing wherein I have shown diagrammatically in Fig. 1 a control system embodying my invention; Fig. 2 illustrates diagrammatically the construction of a portion of one of the commutators used for the control of the accelerating resistance; Fig. 3 is a sectional elevation, taken on the lines 3—3 of Fig. 2, illustrating one of the commutator bars and Fig. 4 is a fragmentary diagrammatic illustration of a modified form of my invention provided with a current responsive device for controlling the speed of the pilot motor.

It is believed that a clear understanding of the arrangement and operation of the various parts of the system will be better understood from a complete description of the operation of the system as a whole. Therefore, the construction and arrangement of certain of the devices only will be first described in detail.

Figures 1, 2, 3, 4:
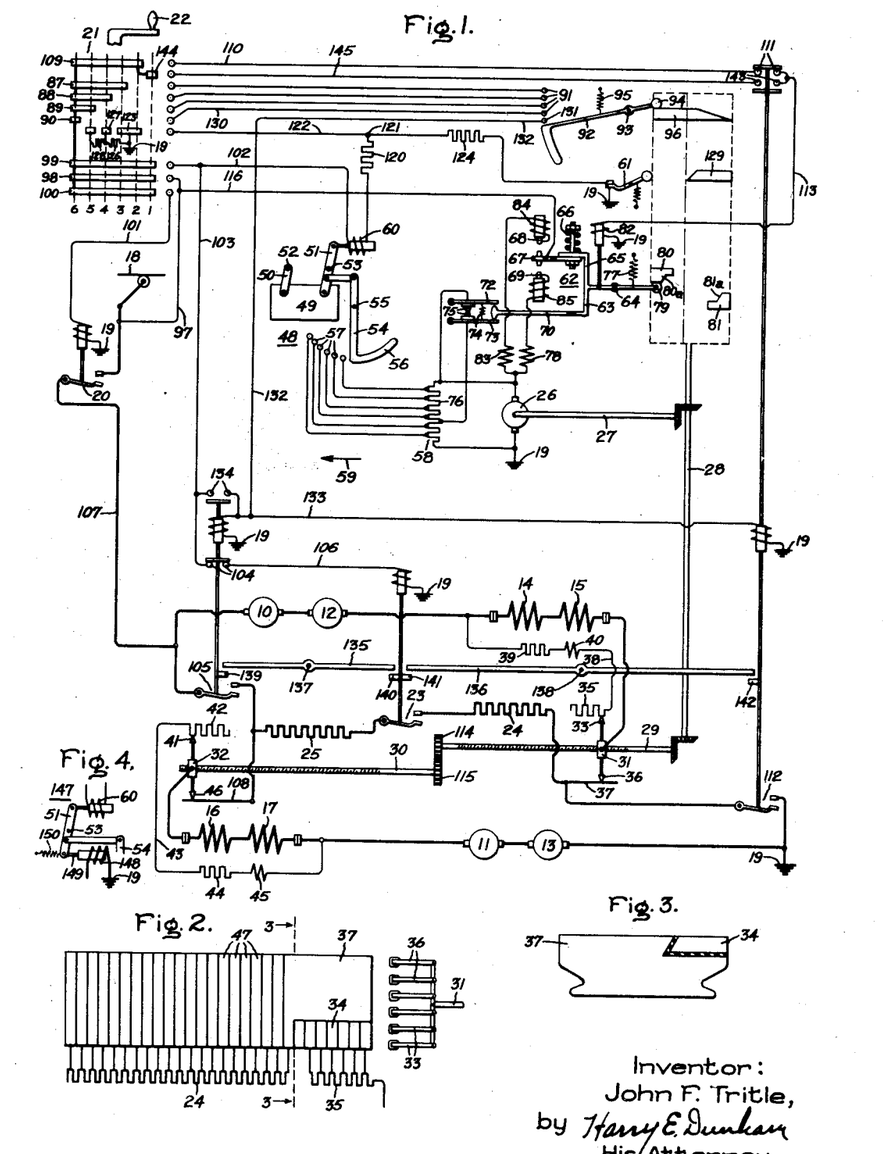

Referring to the drawing, I have shown my invention in one form as applied to the control of the vehicle or train driving motors 10—13, inclusive, the motors 10 and 12 being provided respectively with series field windings 14 and 15, while the motors 11 and 13 are provided respectively with series field windings 16 and 17. The motors are energized from a suitable source of supply indicated by a trolley supply line 18 and a ground connection 19, a line circuit breaker 20 being connected between the trolley and the motor circuits. By means of a master controller 21 operable through a plurality of positions by means of a handle 22, the line circuit breaker 20 may be closed and the motors connected in series with the resistances 24 and 25 by means of a series contactor 23.

To accelerate the motors, a pilot motor 26 drives through suitable gearing and shafts 27—30, inclusive, a pair of brush arms 31 and 32 of identical construction to exclude the accelerating resistances 24 and 25 from the motor circuits. While other forms of main controllers may be used, I prefer to use a main controller of the commutator type. In the main controller illustrated, it will be observed that the brush arm 31 supports brushes 33 which initially engage, Fig. 2, short commutator bars 34 connected to a field shunting resistance 35. The remaining brushes 36 engage a wide commutator bar 37 to complete the main motor circuit. It will be observed that the resistance 35 is connected by conductor 38 in parallel circuit relation with the field windings 14 and 15, a suitable amount of resistance 39 and reactance 40 being included in this field shunting circuit. Similarly, the brush arm 32 supports brushes 41 which control through their associated commutator bars a field shunting resistance 42 connected by conductor 43 in parallel circuit relation with the field windings 16 and 17, resistance 44 and reactance 45 being included in this field shunting circuit. The additional brushes 46 also engage a wide commutator bar to complete the main motor circuit during the field shunting.

Though the number of brushes may be varied in accordance with the value of current to be carried, in one embodiment of my invention six brushes were mounted on each brush arm. As shown in Fig. 2, the upper four brushes 36 first engage the commutator bar 37, and serve to carry the motor current during the initial acceleration of the motors. The two lower brushes 33 engage the commutator bars 34 and control the degree of field shunting or the excitation of the motors. In the initial position with the lower pairs of brushes engaging the first commutator segments a minimum amount of the field shunting resistance 35 and 42 are connected in the circuit. Consequently, the motors start with a predetermined maximum reduced field excitation. Thereafter, the field excitation is gradually increased until the field shunting circuit is interrupted. All six of the brushes then engage the first of the main commutator bars 47 and serve to carry the motor current. As will be explained more fully hereinafter, the series resistances 24 and 25 are first excluded from the circuit with the motors connected in series. The motors are then connected in parallel circuit relation with the resistances 24 and 25 connected respectively in series with the branches of the parallel circuit. Operation of the brush arms 32 and 33 toward their initial position then serves to exclude the resistances to complete the acceleration of the motors.

In order to control the rate of acceleration of the motors 10-13, inclusive, independently of the load on the car, I provide a device 48 responsive to the acceleration of the car for maintaining a predetermined constant rate of acceleration. The device 48 consists of a relatively heavy weight 49, of the order of thirty pounds, suspended as a pendulum by means of levers 50 and 51 pivoted respectively at 52 and 53. The weight 49 is preferably free to assume a position determined by the force of gravity, centering springs (not shown) being provided to insure the return of the weight 49 to its predetermined position. By means of a lever 54, pivoted at 55 and connected at one end to the lever 51, a contact arm 56 is supported for movement into engagement with a plurality of stationary contacts 57 each of which is connected to a different portion of a resistance 58 which is connected across or in parallel circuit relation with the armature of the pilot motor 26. Normally, the contact arm 56 is out of engagement with the contacts 57 so that the maximum value of the resistance 58 is connected in shunt with the armature of the pilot motor 26. When the car or vehicle is accelerating in a left-hand direction, as indicated by the arrow 59, the inertia of the weight 49 operates the contact arm 56 into engagement with a predetermined number of the contacts 57 to short circuit a predetermined amount of the resistance 58. The speed of the pilot motor 26 is, therefore, determined as a direct function of the rate of vehicle acceleration. In order to select different rates of acceleration, a calibrating coil 60 is arranged to act on the lever 51 in a direction to assist tending to move the weight 49. By varying the energization of the calibrating coil 60 different predetermined rates of acceleration may be selected, the lowest rate being obtained on controller positions 2 and 3 and the highest rate on controller position 6. By means of a cam operated switch 61 energization of the calibrating coil 60 is controlled as desired to insure a low speed operation of the motor 26 and a corresponding low rate of vehicle acceleration during the field shunting operations.

The direction of rotation of the pilot motor 26, and under certain conditions its speed of operation, is determined by means of a pilot relay 62 which consists of a bifurcated arm 63 pivoted at 64, one leg 65 of which resiliently supports by means of a spring 66 a contact 67 movable into and out of engagement with one or the other of a pair of stationary contacts 68 and 69. The other leg 70 of the bifurcated lever 63 is provided with an insulated end operable into engagement with one or the other of a pair of pivoted members 72 and 73 which are biased by a spring 74 to maintain closed a pair of contacts 75 which normally short circuit a large portion 76 of the resistance 58. The bifurcated member 63 is biased by a spring 77 as well as by gravity to its lowermost position so that the movable contact 67 tends to engage the stationary contact 69 to energize a field winding 78. When this field winding is energized the motor 26 rotates in a direction to return the brush arms 31 and 32 to their initial positions. In the initial position, however, it will be observed that a roller 79 carried by an extension of the lever 63 bears against a cam 80 and holds the movable contact 67 in its neutral or mid-position and out of engagement with the stationary contacts 68 and 69. A second cam 81 performs a similar function, which will be explained more fully hereinafter, as the motor accelerating resistances 24 and 25 are excluded from the series motor circuit.

In order to energize the pilot motor 26, a relay coil 82 is arranged to act upon the bifurcated member 63 to move it in a clockwise direction about its pivot 64 to complete a circuit through the stationary contact 68 and through a second field winding 83 provided for the motor 26. It will be observed that the connection from each of the stationary contacts 68 and 69 is through blowout coils 84 and 85 which coils besides performing the function of blowing out the arc also exert an attractive effort on the movable contact 67 which is carried by an arm formed of magnetizable material such for example as transformer steel.

In order to accomplish transition of the motors from series to parallel without noticeably changing the torque exerted by the motors on the car or vehicle, I utilize the bridge type of transition and predetermine, in accordance with the rate of acceleration called for by the master controller 21, the amount of resistance connected in each branch of the bridge or parallel circuit at the instant the motors are connected in parallel. Although the accelerating rate is independent of the load on the vehicle, the motor current is to a large degree dependent upon the particular selected accelerating rate. Thus, for example, if the lower rate, i. e., one and one-half miles per hour per second, is selected the motor current may be approximately one-half the higher rate of four miles per hour per second. Consequently, by providing a plurality of segments 87-90, inclusive, on the master controller 21 to complete connections to a plurality of stationary contacts 91, the transfer of the motor connections occurs at times which depend upon the value of the motor current as determined by the setting of the master controller 21. This variable transfer is determined in part by a contact arm 92 pivoted at 93 and supporting a roller 94 which is normally biased by a spring 95 into engagement with a cam 96 operable by the shaft 28. The cam 96 is inclined at one end so that the arm 92 under the influence of the spring 95 engages one or more of the contacts 91 as the resistance is excluded from the motor circuit.

It is now believed that a comprehensive understanding of my invention, including the construction and the arrangement of the various apparatus as well as its operation, will be facilitated by a description of the operation of the system as a whole.

Accordingly, it will be assumed that the master controller occupies its first or switching position. An energizing circuit is at once completed for the line circuit breaker 20 which circuit may be traced from the trolley supply line 18 by conductor 97, controller segments 98 and 100, conductor 101, operating coil of the line contactor and to the ground connection 19. At the same time the series contactor 23 is closed by an energizing circuit which may be traced from the trolley supply line 18 by conductor 97, controller segments 98 and 99, conductors 102 and 103, interlock contacts 104 provided on a parallel or bridging contactor 105, conductor 106 and through the operating coil of the series contactor to the ground connection 19. The closure of the series contactor 23 connects the motors in a series circuit which may be traced from the trolley supply line 18 by line contactor 20, conductor 107, motors 10 and 12, field windings 14 and 15, brush arm 31 and brushes 36, commutator bar 37, resistance 24, contacts of the series contactor 23, resistance 25, commutator bar 108, brushes 46, brush arm 32, series field windings 16 and 17, and by motors 11 and 13 to the ground connection 19. As described above, the field windings of the respective motors are by-passed or shunted through circuits controlled by the brushes 33 and 41, the motors starting on a maximum reduced field excitation. It will also be observed that the contacts of a reversing switch are shown on opposite sides of the respective groups 14, 15 and 16, 17 of motor field windings. By means of the reversing switch the field winding connections may be reversed to change the direction of travel.

Although the operation of the master controller 21 to its first position causes the completion of the series motoring circuit, movement of the brush arms 31 and 32 of the main controller does not occur until the master controller 21 is moved to its second position to energize the operating coil 82 of the relay 62. Assuming that the controller occupies its second position, this circuit may be traced from the supply line 18, conductor 97, controller segments 98 and 109, conductor 110, interlock contacts 111 provided on a ground or bridging contactor 112, conductor 113 and by the operating coil 82 of the relay 62 to the ground connection 19. The coil 82 exerts an attractive effort on its operating member to rotate the bifurcated arm 83 in a clockwise direction around its pivot 84. As soon as the movable contact 67 engages the stationary contact 68, an energizing circuit is completed for the armature and the field winding 83 for rotation of the pilot motor in a direction to drive the brush arms 31 and 32 towards the gears 114 and 115 interconnecting the respective shafts 29 and 30. This circuit may be traced from the trolley supply line 18, by conductors 97 and 116, movable contact 67, stationary contacts 68, blowout coil 84, field winding 83 and by the armature of the motor 26 to the ground connection 19. The initial speed of the motor 26 is relatively high inasmuch as the leg 70 is operated by the coil 82 to interrupt the short circuit of the resistance section 76 and thereby connect a maximum amount of the resistance 58 across the pilot motor armature.

The initial movement of the brush arms 31 and 32 increases the field excitation of the respective motors by increasing the portions of the resistances 35 and 42 connected in the field shunting circuits. After the brushes 33 and 41 have operated to include all of the resistances 35 and 42 in their respective field shunting circuits, these brushes then move into engagement with the commutator bars 47 and thereby assist the brushes 36 in carrying the accelerating current of the motors. Obviously, the number of contact bars provided for the field shunting steps may be varied. In a typical embodiment twenty commutator bars are provided for field shunting and one hundred and thirty for the exclusion of the resistances 24 and 25. By reason of the field shunting, the tractive effort exerted by the motors in starting is reduced somewhat. This is deemed desirable inasmuch as it causes the motors to exert a gradually increasing torque on the train. Any slack between cars is, therefore, gradually taken up and a smooth starting of the train is always assured. Since, the initial speed of the pilot motor 26 is relatively high, the motor current rises rapidly to accelerate quickly the car or vehicle. As soon as the train attains a predetermined low rate of acceleration, the weight 49 due to its inertia operates the contact arm 56 into engagement with a predetermined number of the stationary contacts 57 to short circuit a predetermined amount of the resistance 58 connected across the armature of the pilot motor 26. If the movement is such that in the series position the device 48 is to maintain a rate of acceleration of one and one-half miles per hour per second, the contact arm 56 will vary the resistance 58 and the speed of the motor 26 so that the motors 10 to 13, inclusive, will maintain constant a rate of acceleration of one and one-half miles per hour per second.

It should here be observed that the coil 60 is energized to assist movement of the weight 49 and consequently predetermines the rate of acceleration held by the pilot motor 26. The energizing circuit for the coil 60 may be traced from the trolley supply line 18, by conductor 97, controller segments 98, 99, conductor 102, coil 60, and by a resistance 120 to a point 121. This circuit then divides, one branch extending by conductor 122 to a controller segment 123 and to the ground connection 19. The other branch of the circuit extends from point 121 through a resistance 124 and through contacts of the cam operated switch 61 to the ground connection 19. However, on the second and third positions of the controller 21 this branch parallel circuit through resistance 124 and switch 61 is shunted to ground through wire 122 and segment 123 and therefore does not affect current through coil 60.

The speed of the motors and vehicle continues to increase until the resistances 24 and 25 have been excluded by the brush arms 31 and 32 from the motor circuits. As the brush arms 31 and 32 approach their final positions, the shaft 28 drives the cam 81 into engagement with the roller 79 of the pilot relay 62. It will be noted that this cam 81 initially lifts the roller 79 a slight amount as indicated at 81a, which movement rotates the arm 63 and the leg 70 an amount sufficient to close the contacts 75 which short circuits the resistance section 76. The motor 26 then operates at reduced speed. The resiliently mounted movable contact 67 is maintained in engagement with the contact 68 due to the attractive effort exerted by the holding and blowout coil 84 until the roller 79 moves a predetermined distance up the inclined portion of the cam 81. The rise of the roller 79 builds up a force on the contact 67 which force as soon as it exceeds the holding effort, operates the movable contact 67 with a snap action out of engagement with the stationary contact 68. The blowout coil 84 then serves to blow out any arc which may exist at the time of the contact separation. As the pilot motor 26 comes to a standstill, the motors 10 to 13, inclusive, are connected in series relation with each other with all of the series resistances 24 and 25 excluded from the circuit.

It will now be assumed that the master controller 21 has been advanced to one of its parallel positions 3 to 6, inclusive, to start the vehicle from standstill. In each of the accelerating positions the transfer from series to parallel takes place automatically. The rate of acceleration and the magnitude of the motor current varies with the position of the master controller. For example, in the third position the rate remains the same as in the second or series position except that the motor acceleration continues with the motors connected in parallel. In the fourth position, however, a resistance 126 is connected by the controller segment 127 in circuit with the coil 60 to decrease its current. A greater rate of acceleration is then required to move the weight 49 to decrease the speed of the pilot motor 26. Since the pilot motor decreases the series resistances 24 and 25 at a greater rate the motor current is correspondingly higher. In the fifth position an additional resistance 128 further decreases its current, while in the sixth position the circuit through the conductor 122 is interrupted, the pilot motor 26 then operating at its maximum speed to maintain the maximum rate of acceleration.

By means of the branch circuit through resistance 124 and the cam operated switch 61, the speed of the pilot motor for master controller positions four to six, inclusive, is less during the field shunting operations than for the full field operations. The greater the current through the coil 60 the less is the acceleration required to move the weight 49. Consequently, during field shunting the pilot motor is operated at a lower speed to prevent the rise of the motor accelerating current to excessive values. The branch circuit with its fixed resistance 124 bears a definite relation with the resistances 126 and 128 and since the resistance 124 is connected in parallel with the resistances 126 and 128 predetermines the decreased rate of acceleration for each of controller positions four to six, inclusive. In the fourth position of the controller the resistance 126 is connected in parallel with the resistance 124 while in the fifth position resistances 126 and 128 are connected in series with each other and in parallel with the resistance 124. In the sixth position the resistance 124 alone determines the decreased speed. Obviously, the speed or acceleration may be widely varied by suitably varying the value of resistances 120, 124, 126, and 128.

As the field excitation of the motors reaches a maximum value, a cam 129 opens the switch 61 against its bias and maintains the switch in its open position during the time that the resistances 24 and 25 are being excluded from the motor circuits.

Assuming the controller is in its sixth position, the pilot motor 26 operates at a speed which will produce a predetermined maximum rate of car acceleration. The field excitation of the motors is first increased to a maximum value. The switch 61 is then opened to increase the rate of acceleration, the pilot motor 26 then driving the brushes to decrease the value of the resistances 24 and 25 connected in series with the motors. Since the value of resistance removed from the circuit for each movement of the brushes from one commutator bar to the other is very small, the instantaneous variations in the motor accelerating current are negligible. There does not occur a sudden rise in motor current which decreases with the resulting rise in the speed of the motors. The motor current and hence the motor acceleration varies more nearly in accordance with a straight line function and in direct relation to the speed of the pilot motor 26. Therefore, the position of the master controller 21 predetermines the value of accelerating current which is maintained through the motors 10—13, inclusive. Since the increments of current during the exclusion of the resistance are so small, the result is a very smooth acceleration. Furthermore, undesirable arcing at the brushes is eliminated.

Continuing with the operation of my invention, the bridge transition of the motor connections from series to parallel circuit relation is accomplished so that the resistance which is reconnected in each branch of the parallel circuit is predetermined in accordance with the value of the motor current, and is of such value as to maintain the current in each motor unchanged when the connections are changed from series to parallel. As I have stated, the rate of acceleration called for by the master controller 21 is maintained by an accelerating current of predetermined magnitude. Therefore, by correlating the position of the master controller 21, which represents magnitudes of the motor current, with the movement of the brush arms 31 and 32, the transfer of the motor connections occurs automatically so that the correct amount of resistance is reconnected in each branch of the parallel circuit for a true bridge transfer. Thus with the master controller 21 in its sixth position, the conductor 130 leading to the first of the stationary contacts 91 is energized from controller segment 90. The transfer of the motor connections is initiated when the contact arm 92 bridges the contacts 91 and 131. The movement of the contact arm 92 is determined by the cam 96 so that the contact arm 92 engages an additional one of the contacts 91 when the brushes have excluded different values of resistance from the motor circuit. This also serves to predetermine the amount of resistance which is initially connected in each branch of the motor circuit.

As soon as the roller 94 starts down the inclined cam 96 the contact arm 92 is operated by a spring 95 to complete a bridge connection between the contact 131 and the first of the contacts 91. The transfer of the motor connections is, therefore, accomplished by the resulting closure of the ground and parallel contactors 105 and 112. The energizing circuit for these contactors may be traced from the trolley supply line 18, conductor 97, controller segments 98 and 90, conductor 130, contact 91, contact 131, conductor 132, and by conductor 133 through the operating coils of the parallel and ground contactors 105 and 112 to the ground connections 19. Both contactors thereupon start to close, the parallel contactor 105 interrupting through its interlock contacts 104 the energizing circuit of the series contactor 23. The holding circuit is completed for both contactors by means of interlock contacts 134 closed with the contactor 105.

The contactors 23, 105 and 112 are mechanically interlocked through levers 135 and 136 pivoted at 137 and 138 in order to insure the shortest and smoothest possible transfer from the series to the parallel connections. With the series contactor 23 closed, the parallel contactor 105 can move towards its closed position far enough to open its interlock contacts 104 but not sufficiently far to complete the motor circuit. As soon as the contacts 104 open, the series contactor coil is deenergized and its movement toward the open position is accelerated by the levers 135 and 136 which are operated by the parallel and ground contactors 105 and 112. The time required for the transfer of the connections is minimized by the adjustment of projections 139–142, inclusive, secured to the contactors 23, 105 and 112 so that the circuits are completed by the parallel and ground contactors 105 and 112 at substantially the same instant that the motor circuit is interrupted by the series contactor 23. The closure of the ground contactor 112 opens its interlock contacts 111 and closes its interlock contacts 143, the function of which will be described hereinafter.

One branch of the parallel motor circuit extends from conductor 107 through the motors 10 and 12, their field windings 14 and 15, brush arm 31, brushes 33 and 36, resistance 24, and by the ground contactor 112 to ground. The other branch of the motor circuit extends from conductor 107, contacts of parallel contactor 105, resistance 25, brush arm 32, brushes 41 and 46, field windings 16 and 17, motors 11 and 13 and to the ground connection 19.

The reversal of the pilot motor 26 to return the brush arms 31 and 32 towards their original positions is accomplished by the opening of the interlock contacts 111 operated with the ground contactor 112. The circuit to the relay coil 82 is interrupted, permitting the spring 77, assisted by gravity, to operate the arm 83 of the relay 82 in a counterclockwise direction, the movable contacts 67 moving into engagement with the stationary contact 69 while the leg 70 operates the member 73 to interrupt the short circuit completed through the contacts 75. The field winding 78 is thereby energized through the circuit traced above to operate the motor 26 in a direction to return the brush arms towards their original position. The return movement of the brush arms 31 and 32 operates to exclude the section of resistance included in each of the motor circuits, the rate of movement of the brush arms being dependent as before upon the speed of the pilot motor 26.

If the master controller 21 had been operated to its third position, it will be seen that the contact member 92 must engage the upper of the contacts 91 to complete a circuit through the conductor 132 and the operating coils of the parallel and ground contactors 105 and 112. This circuit however is not completed until the cam 96 has moved a substantially greater distance than for the sixth position of the master controller. In other words, the lower the rate of acceleration called for the greater is the amount of resistance removed from the series motor circuit before the transfer to the parallel connections. Conversely, the greater the rate of acceleration the less is the value of the resistance which is removed from the series motor circuit. The amounts of resistance removed from the series circuit are reconnected in their respective branches of the parallel circuit. As I have stated, the value of motor current depends to a large degree upon the rate of acceleration called for and, therefore, by predetermining the value of resistance required in each branch of the parallel circuit to accomplish a true bridge transition for different values of motor current, the transition can be effected without noticeable change of motor torque. For the purpose of a specific example, it will be assumed that the master controller 21 is in its third position causing the device 46, as hereinbefore described, to maintain a low rate of acceleration, say two miles per hour per second. It will be further assumed that with a given car load and a 560 volt source of energy, this rate of acceleration corresponds to an average motor current of 156 amperes.

At this lowermost rate of acceleration, it is desirable to entirely exclude the resistances 24 and 25 from the series motor circuit before effecting the transition from series to parallel, and to effect a true bridge transition the resistance of each parallel motor circuit immediately after the transition must be such as to maintain the motor current at 156 amperes. It will be apparent, therefore, that just prior to the transition, all of the resistances being excluded, the voltage across each pair of motors is equal to one-half of the line voltage; i. e. 280 volts, and since the transition substitutes one of the resistances 24 and 25 for one pair of motors in each parallel circuit, each of the resistances must absorb one-half of the line voltage with 156 amperes flowing. Accordingly, each of the resistances 24 and 25 has a resistance value of 1.8 ohms. It will be apparent that if the value of the resistances 24 and 25 had been less than 1.8 ohms, for example 1 ohm, a rush of current would have taken place through the motors, immediately following the transition, of such magnitude as to cause a relatively large change in torque, or as experienced by the passengers, an uncomfortably abrupt change in the rate of acceleration.

If the master controller 21 is assumed to be in its sixth position so as to cause the device 48 to maintain a high rate of acceleration, say 4 miles per hour per second, corresponding to a motor current of 280 amperes, it will be apparent that the transition must take place with different values of resistance in the circuit in order to accomplish a true bridge transition. Accordingly, the cam 96 is arranged to initiate the transition at the instant that 1.4 ohms is excluded from each of the resistances 24 and 25. Under this condition, just previous to the transition the voltage across each pair of motors is 168 volts and the voltage across the .4 ohm section of each of the resistors 24 and 25, not yet excluded from the circuit, is 112 volts. Immediately after the transition, each of the previously excluded 1.4 ohms sections of the resistances, one of which sections is now connected in each of the parallel motor circuits, absorbs 392 volts with 280 amperes flowing and the voltage across each pair of motors is thus maintained at 168 volts.

Similarly, the slope of the cam 96 is arranged to initiate the transition at the proper instant when the controller is in either position 4 or 5, so that the correct proportion of the resistances 24 and 25 will be in the circuit at the completion of the transition so as to produce a true bridge transition. From the above examples, it will be observed that a true bridge transition is accomplished under certain conditions by excluding all of the resistances and under other conditions by excluding only a part of the resistances from the series circuit before transferring from series to parallel connections.

As I have already stated, the transfer is determined as a function of acceleration or motor current so that the value of resistance in the branches of the parallel circuit is always predetermined to produce a true bridge transition. In this connection, the speed of the pilot motor 26 may be controlled in response to the motor current by utilizing the device 147 shown in Fig. 4 instead of the weight 49. The device 147 consists of a current coil 148 which is connected in the motor circuit 107 between the switch 20 and the motors. The coil 148 by means of its plunger 149 actuates the levers 51 and 54 (Fig. 1) against the bias of a spring 150 so that the contact arm 56 varies the speed of the pilot motor 26 to maintain a predetermined value of accelerating current. As in the case of the weight operated device 48, the calibrating coil 69 assists the current coil 148 in moving the contact arm 56. Different values of accelerating current are therefore maintained in accordance with the position of the master controller 21.

In the appended claims, acceleration responsive means is defined to include an inertia operated device, a current operated device or other means directly or indirectly responsive or proportional to acceleration.

Continuing with the operation of my invention, as the brush arms 31 and 32 exclude the last portions of the resistances 24 and 25 from the respective branches of the parallel circuits, the cam 128 is moved out of engagement with the switch 61 which thereupon operates to its closed position to complete a circuit for the coil 60 of the device 48. As described above, the coil 60 thereupon assists the weight 49 in its movement in response to acceleration and thereafter causes the device 48 to slow down the pilot motor 26 during the remainder of its operation. This is deemed desirable inasmuch as the remaining operation of the brush arms 31 and 32 acts to decrease the field excitation up to a predetermined maximum value, and unless the accelerating rate is correspondingly reduced during shunt field operation the armature current might rise to an undesirably high value. As is well known, the torque per armature ampere is less on reduced field than on full field.

As soon as the maximum field shunting is obtained, the motors 10 to 13 then accelerate to their maximum speed. As the final position is approached, the cam 80 acts against the roller 79 to close the contacts 75 which short circuit the section 76 of the pilot motor resistance 58 to slow down materially the pilot motor. The holding coil 85 maintains the circuit for the field winding 78, however, until the roller 79 starts up the inclined portion 80a of the cam. The energy stored in the spring 66 then operates the contact 67 with a snap action to its open circuit position to deenergize the pilot motor. In this manner the brush arms 31 and 32 are always brought to a standstill in the exact off or parallel position regardless of the speed at which they were operated during acceleration.

In order to provide the maximum flexibility of operation, the master controller 21 is provided with a segment 144 by means of which the pilot motor 26 may be reversed to reduce either the rate or the speed of operation of the vehicle. For example, if the master controller 21 is returned to its first position after the brush arms 31 and 32 had advanced through a substantial portion of their series movement and before the motors had been reconnected in parallel circuit relation, it will be observed that the circuit completed through the conductor 110 and the circuit completed through the controller segment 109 through the relay coil 82 is interrupted. The relay arm 83 thereupon operates under the influence of gravity and the spring 77 to complete a circuit through its contacts 87 and 89 through the field winding 78 and the armature of the motor 26 to reverse its direction of rotation. The brush arms 31 and 32 are thereupon operated towards the off position to reinsert the resistances 24 and 25 in the series motor circuit.

If the motors have been connected in parallel circuit relation, however, and the master controller is returned to its first position, the coil 82 is energized through the controller segment 144, conductor 145, interlock contacts 143 closed with the contactor 112, conductor 113 and by coil 82 to the ground connection 19. The coil 82 thereupon operates the contact 87 into engagement with the contact 88 to complete the energizing circuit for the pilot motor field winding 83. Consequently, the pilot motor 26 is rotated towards the series position to reinsert resistance in each of the parallel branches of the motor circuits. The motors remain connected in parallel circuit relation, however, since the parallel and ground contactors 105 and 112 have a common holding circuit completed through the interlock contacts 134 operated with the contactor 105. However, when the master controller 21 is returned to its off position, the relay 82 energizes the pilot motor 26 in a direction to return the brush arms 31 and 32 and the various cams to their original positions.

While I have shown a particular embodiment of my invention, it will be understood of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. The combination with a plurality of motors and a control means for controlling the amount of resistance in circuit with said motors, means for establishing series and parallel circuit relations of said motors with resistance in series with each circuit, means for controlling the operation of said control means to produce substantially constant predetermined rates of acceleration of said motors, a master controller operable through a plurality of positions to select a given rate of acceleration, and means dependent upon the rate of acceleration selected by said master controller for predetermining the amount of resistance included in each branch of said parallel circuit when said motors are connected in parallel circuit relation, said predetermined value of resistance being in each case of a value such that each branch of said parallel circuit has the same current value after said transfer as said series motor circuit had the instant before said transfer.

2. The combination with a plurality of motors and a controller for controlling the amount of resistance in circuit with said motors, of means for energizing said motors first in series circuit relation and then effecting a bridge transition of said series connected motors to parallel circuit relation with resistance first connected in said series circuit and then connected in circuit with each of the branches of said parallel circuit, control means for selecting a predetermined rate of acceleration of said motors, and means dependent upon the selected rate of acceleration for effecting said transition of said motor connections so that the motor circuits remain in electrical balance at the instant said parallel connections are completed.

3. The combination with a plurality of motors, an accelerating resistance and a main controller for controlling the amount of resistance in circuit with said motors, of means for establishing series and parallel circuit relations of said motors with said resistance in series with said series circuit and a portion of said resistance in series with each of the branches of said parallel circuit, a master controller for varying the rate of acceleration of said motors, and means dependent upon the selected rate of acceleration for predetermining both the amount of resistance excluded from said series circuit at the time of said transfer and the amount of resistance included in each of said branch circuits at the instant said motors are connected in parallel whereby interchange of current between the branches of said parallel circuit is minimized.

4. A control system for electric motors provided with series field windings, means energizing said motors for series and for parallel operation with a predetermined amount of resistance in series with said motors, field shunting resistance initially connected in parallel circuit relation with said field windings, and control means operable in opposite directions during series and parallel operation of said motors and in its initial position permitting a predetermined minimum field excitation for reduced field starting, said control means when operating in one direction gradually increasing to a maximum said field excitation and then gradually excluding said series resistance, said control means when operated in the opposite direction gradually excluding said series resistance and after the exclusion of said series resistance gradually decreasing to a predetermined value said field excitation of said motors.

5. A control system for electric motors provided with series field windings, means for energizing said motors in series circuit relation with a predetermined amount of resistance in said circuits, control means establishing field shunting circuits of relatively low impedance for reducing the field excitation of said motors upon initial energization of said series connected motors, said control means thereafter operating to increase said field excitation and to exclude said resistance from said series circuits, and means for connecting said motors in parallel circuit relation with a predetermined amount of resistance in circuit therewith, said control means then operating first to exclude at a predetermined rate said resistance from said circuit and then to reduce at a lesser rate said field excitation of said motors.

6. A control system for electric motors provided with series field windings, means for energizing said motors in series circuit relation with a predetermined amount of resistance in said circuit, and control means establishing field shunting circuits for reduced field starting, said control means being operable to increase at a predetermined rate said field excitation and then to exclude at a different rate said resistance from said series circuit, means for connecting said motors in parallel circuit relation with a predetermined amount of resistance in each branch circuit thereof, said control means then operating first to exclude at a given rate said resistance from said branches of said parallel circuit and then operating at a lesser rate to reduce the field excitation of said motors.

7. A control system for electric motors provided with series field windings, means for energizing said motors in series circuit relation with a predetermined amount of resistance in said circuit, control means in an initial position establishing field shunting circuits for reducing the field excitation of said motors, means for operating said control means to increase at a given rate said field excitation and thereafter to exclude at a greater rate said resistance from said series circuit, means for connecting said motors in parallel circuit relation with a predetermined amount of resistance in series circuit therewith, said control means then operating first to exclude at a predetermined rate said resistance from said parallel circuit and then to reduce at a lesser rate the field excitation of said motors, and means for modifying the operation of said control means to select the rate at which said resistance is included in or excluded from said circuits, the rate of change of said field excitation being less than for any of the selected rates.

8. The method of controlling the acceleration of a plurality of motors for an electric vehicle which consists in connecting the motors in series circuit relation with a predetermined amount of resistance in said circuit, gradually decreasing said resistance, reconnecting said motors by bridge transition in parallel circuit relation with a predetermined amount of resistance in each circuit, and varying the amount of the resistance initially connected in each branch of said parallel circuit in accordance with the rate of acceleration of said vehicle at the instant of transfer.

9. The combination with a plurality of motors each provided with a field winding and a controller for controlling the amount of resistance in circuit with said motors, of means for establishing first series and then parallel circuit relation of said motors with resistance in circuit with each circuit, field shunting circuits for said motors controlled by said controller for starting said motors on reduced field, increasing the fields of said motors to normal value before the completion of the acceleration with the series circuit relation of said motors, thereafter maintaining said field normal while the motor connections are changed from series to parallel and for completing the acceleration of said motors after they have been connected in parallel by again reducing the field excitation of said motors.

10. The combination with a plurality of motors each provided with a field winding and a controller for controlling the amount of resistance in circuit with said motors, of means for establishing first series and then parallel circuit relation of said motors with resistance included in each branch of the parallel circuit, field shunting circuits for said motors controlled by said controller for starting said motors on reduced field with the series circuit relation of said motors thereafter opening said field shunting circuit to establish normal field for the completion of the series circuit relation of said motors and the beginning of the parallel circuit relation of said motors and for completing the acceleration of said motors after they have been connected in parallel by again reducing the field excitation of said motors, and means for varying the speed of operation of said controller.

11. The combination with a plurality of motors each provided with a field winding and a controller for controlling the amount of resistance in circuit with said motors, of means for establishing first series and then parallel circuit relation of said motors with resistance in circuit with each circuit, field shunting circuits for said motors controlled by said controller for starting said motors on reduced field and for completing the acceleration of said motors after they have been connected in parallel by again reducing the field excitation of said motors, and control means for operating said controller at a given rate to control said field shunting circuits and at a different rate for controlling said resistance.

12. The method of accelerating a plurality of electric motors provided with field windings which consists in energizing said motors with predetermined minimum field excitation, gradually increasing said field excitation at a predetermined rate and thereafter gradually increasing the energization of said motors, reconnecting said motors in parallel circuit relation with the resistance in each branch circuit selected to give a current in each branch circuit substantially equal to the current in the motor circuit when the motors were connected in series circuit relation, gradually excluding the resistance from said parallel circuit and thereafter gradually decreasing the field excitation of said motors.

13. The combination with an electric vehicle having a plurality of motors, accelerating resistances and a controller for controlling the amount of resistance in circuit with said motors, of means for establishing first series and then parallel circuit relation of said motors with resistance first in series with said series circuit and a predetermined amount of resistance then in series with each of said parallel circuits, driving means for said controller, means responsive to a predetermined rate of acceleration of said vehicle for varying within predetermined limits the speed of said controller driving means to maintain said rate of acceleration substantially constant, a master controller for selecting different rates of acceleration, and means dependent upon the rate selected by said master controller for effecting transfer of said motors from said series to said parallel circuit relation with less resistance in each of said parallel circuits for the higher selected rates than for the lower selected rates.

14. The combination with a plurality of motors and an accelerating resistance therefor, of connections for establishing first series and then parallel circuit relation of said motors with resistance in series with each circuit, a controller operable in opposite directions between predetermined limits during series and parallel operation of said motors for excluding resistance from said circuits, driving means for said controller, control means for controlling the direction and speed of rotation of said controller driving means, and means for actuating said control means as said controller approaches said limits for decreasing the speed of operation of said driving means so as gradually to bring said controller to a standstill at one or the other of its limits.

15. The combination with a plurality of motors for an electric vehicle and an accelerating resistance therefor, of connections for establishing first series and then parallel circuit relation of said motors with resistance in series with each circuit, a controller operable in opposite directions between predetermined limits during series and parallel operation of said motors, driving means for said controller, control means for controlling the direction and speed of rotation of said driving means, means for actuating said control means as said controller approaches said limits for decreasing the speed of operation of said driving means so as gradually to bring said controller to a standstill at one or the other of its limits, and means responsive to the acceleration of said vehicle for varying the speed of said driving means.

16. The combination with a plurality of motors for an electric vehicle and an accelerating resistance therefor, of connections for establishing first series and then parallel circuit relation of said motors with resistance in series with each circuit, a controller operable in opposite directions between predetermined limits during series and parallel operation of said motors, driving means for said controller, control means for controlling the direction and speed of rotation of said driving means, actuating means for operating said control means as said controller approaches said limits for decreasing the speed of operation of said driving means so as gradually to bring said controller to a standstill at one or the other of its limits, and means responsive to the acceleration of said vehicle for varying the speed of said driving means over a wide range when said actuating means is ineffective, and for controlling the speed of said driving means over a relatively narrow range when said actuating means is effective.

17. The combination with a plurality of motors, accelerating resistances therefor and means for establishing first series and then parallel circuit relation of said motors with said resistance included in said series and in each branch of said parallel circuit, a main controller operable in one direction to exclude resistance from said series circuit and operable in the opposite direction to exclude resistance from said branches of said parallel circuit, driving means for said main controller, a master controller operable through a plurality of positions for predetermining the speed and direction of rotation of said driving means, said master controller when in one position effecting operation of said driving means in one direction with said motors connected in series and effecting operation of said driving means in the opposite direction and then in the one direction when said motors are connected in parallel.

18. In combination a plurality of electric motors, a series contactor operable from an open to a closed position for connecting said motors for energization in series circuit relation with each other, accelerating resistances, parallel and ground contactors operable from open to closed positions for energizing a predetermined number of said motors in parallel circuits without interrupting the flow of motor current, operating means for each of said contactors, means mechanically interlocking said contactors so that closure of said parallel and ground contactors operates said series contactor to said open position, a normally closed electrically interlocked circuit for said series contactor operating means opened as one of said other contactors moves towards its closed position, said mechanical interlocking means opening said series connection at substantially the same instant that said parallel circuits are completed by said parallel and ground contactors.

19. In a vehicle control apparatus, in combination, a driving motor, means for controlling progressive increase in the supply of current to the driving motor, said means comprising an electroresponsive device, the increase in the supply of current to the driving motor being controlled in accordance with variations in the supply of current to said electroresponsive device, and means including an inertia responsive member for controlling the supply of current to the electroresponsive device, said inertia responsive member having a plurality of contacts associated therewith and engageable thereby in response to different amounts of movements of the said inertia responsive member, means controlled by said contacts and operative to supply different amounts of current to the electroresponsive device.

20. In a vehicle acceleration apparatus, in combination, a motor for operating an acceleration controller, two sets of contacts, an inertia operated device operated at one rate of acceleration of the vehicle to operate one set of contacts, and operated at a different rate of acceleration to operate the other of said sets of contacts, and means responsive to operation of the first mentioned set of contacts for varying the speed of said motor to one degree and responsive to operation of the second mentioned set of contacts for varying the speed of said motor to a different degree.

21. The combination with a plurality of motors and an accelerating resistance therefor, of connections for establishing first series and then parallel circuit relation of said motors with resistance in series with each circuit, a controller operable between predetermined limits during series and parallel operation of said motors for excluding resistance from said circuits, driving means for said controller, control means for controlling the speed of said driving means to control the rate at which said resistance is excluded from said circuits, and means operated with said controller as said controller approaches one of said limits for decreasing the speed of said driving means so as gradually to bring said controller to a standstill at said one limit of operation.

22. In a vehicle control apparatus in combination, an acceleration controller operable between predetermined limits for controlling the speed of the vehicle, a motor for operating said controller, means responsive to a condition of operation of said vehicle for varying the speed of said motor, means for deenergizing said motor to stop said controller at one of said limits, and means operated with said controller as said controller approaches said one limit for decreasing the speed of said motor gradually to bring said controller to a standstill at said one limit.

23. In a vehicle control apparatus in combination, an acceleration controller operable between predetermined limits for controlling the speed of the vehicle, a motor for operating said controller, said motor including armature and field windings, resistance means connected in parallel circuit relation with the armature winding of said motor, means responsive to a condition of operation of said vehicle for varying said resistance to control the speed of said motor, means for deenergizing said motor to stop said controller at one of said limits, and means operated by said controller for varying said resistance independently of said condition responsive means as said controller approaches said one limit to decrease the speed of said motor gradually to bring said controller to a standstill at said one limit.

24. A motor starting system for vehicles comprising an electric vehicle driving motor, a source of energy for said motor, means for connecting said motor to said source of energy, means operative upon connection of said motor to said source for progressively increasing the power supplied to said motor for acceleration thereof, and means responsive to a plurality of predetermined rates of acceleration of the vehicle for controlling the rate of operation of said last named means.

25. In a motor control system for vehicles, the combination with a driving motor, means for connecting said motor to a source of electric energy, and a pilot motor for progressively increasing the speed of said driving motor, of inertia responsive means responsive to a predetermined rate of acceleration of said vehicle for limiting the speed of operation of said pilot motor.

26. In a motor control system for vehicles, the combination with a driving motor, means for connecting said motor to a source of electric energy, automatic control means for progressively increasing the voltage applied thereto to control the acceleration thereof, of means for limiting the rate of operation of the last named means in response to a predetermined acceleration of said vehicle.

27. In a vehicle accelerating control apparatus, in combination, a pilot motor mechanism for controlling an accelerator to control acceleration of the vehicle, an inertia device having a movable contact member adapted to engage at least two relatively stationary contact members in response to different rates of acceleration of the vehicle, and means governed by engagement of said contact members for controlling the degree of operation of said pilot motor mechanism.

28. In a vehicle accelerating control apparatus, in combination, a rotary element for driving an eccelerator to control acceleration of the vehicle, a device having two relatively stationary contacts and a movable contact adapted to engage a first of said stationary contacts at one rate of acceleration of the vehicle and to engage the other or second of said stationary contacts at a higher rate of acceleration of the vehicle, and means operative upon engagement of said movable contact with said first stationary contact for changing the speed of rotation of said rotary element, and operative upon engagement with said second stationary contact for again changing the speed of rotation of said rotary element.

29. A motor starting system for vehicles comprising an electric vehicle driving motor, a source of energy for said motor, means for connecting said motor to said source of energy, means for automatically controlling the power supplied to said motor during acceleration thereof, means responsive to the rate of acceleration of the vehicle for governing the speed of operation of said last named means, and means operable while the vehicle is in motion for manually adjusting the setting of said governing means without affecting the response of the means for governing the rate of acceleration.

30. In combination, a vehicle, an electric motor for driving said vehicle, a source of electric energy therefor, means for connecting said motor to said source of energy, electroresponsive means operative upon connection of said motor to said source of energy for gradually increasing the power supplied to said motor, means responsive to the rate of acceleration of said vehicle for controlling the speed of operation of said last named means, and means manually operable while the vehicle is in motion for gradually adjusting the permissible rate of acceleration in accordance with the load on said vehicle without interrupting the continuity of control effected by said last named means.

31. In combination, a vehicle, an electric motor for driving said vehicle, a source of electric energy therefor, means for connecting said motor to said source of energy, electroresponsive means operative upon connection of said motor to said source of energy for gradually increasing the power supplied to said motor, means responsive to a predetermined rate of acceleration of said vehicle for limiting the rate of power increase to said motor, and means for adjusting the permissible rate of acceleration in accordance with the load on said vehicle without interrupting the continuity of control effected by operation of said last two named means.

32. In a system of motor control, a plurality of motors, a plurality of resistances for controlling said motors, switch mechanism for connecting said resistances in series with each other and said motors in series with each other and in series with said resistances and for connecting said motors in parallel with each other with one of said resistances in each branch of the parallel circuit, control mechanism for said resistances, connections whereby movement of said control mechanism with the motors in series relation gradually excludes said resistances from the series motor circuit up to predetermined values of the resistances and whereby said switch mechanism connects said motors in parallel with the amount of each resistance previously excluded connected in a parallel motor circuit so that a return movement of said control mechanism gradually excludes said resistances from the parallel motor circuits, control means for said switch mechanism, driving means for said control means and said resistance control mechanism, and a master controller for adjusting said control means for operation of said switch mechanism when predetermined portions of said resistances have been excluded from the series motor circuit.

33. In a system of motor control, a plurality of motors, a plurality of resistances for controlling said motors, switch mechanism for connecting said resistances in series with each other and said motors in series with each other and in series with said resistances and for connecting said motors in parallel with each other with one of said resistances in each branch of the parallel circuit, control mechanism for said resistances, connections whereby movement of said control mechanism with the motors in series relation gradually excludes said resistances from the series motor circuit up to predetermined values of the resistances and whereby said switch mechanism connects said motors in parallel with the amount of each resistance previously excluded connected in a parallel motor circuit so that a return movement of said control mechanism gradually excludes said resistances from the parallel motor circuits, control means for said switch mechanism, driving means for said control means and said resistance control mechanism, and a master controller for said motors movable to adjust the speed of operation of said driving means to select a predetermined rate of acceleration for said motors and to adjust said control means for operation of said switch mechanism when predetermined portions of said resistances have been excluded from the series motor circuit.

34. In a system of motor control, a plurality of motors, a plurality of resistances for controlling said motors, switch mechanism for connecting said resistances in series with each other and said motors in series with each other and in series with said resistances and for connecting said motors in parallel with each other with one of said resistances in each branch of the parallel circuit, control mechanism for said resistances, connections whereby movement of said control mechanism with the motors in series relation gradually excludes said resistances from the motor circuit up to predetermined values of the resistances and whereby said switch mechanism connects said motors in parallel with the amount of each resistance previously excluded connected in a parallel motor circuit so that a return movement of said control mechanism gradually excludes the resistances from the parallel motor circuits, driving means for said switch mechanism and said resistance control mechanism, a motor acceleration responsive device for controlling said driving means to maintain a predetermined rate of acceleration of said driving motors, a master controller movable to anyone of a plurality of positions to adjust said acceleration responsive device to maintain a selected rate of acceleration and correspondingly to adjust said switch mechanism to change said motor connections from series to parallel for a selected position of said resistance control mechanism such that the amounts of said resistances excluded from the series motor circuit and thereafter connected in the parallel motor circuits vary inversely with the rate of acceleration.

35. In a system of motor control, a plurality of motors, a plurality of resistances for controlling said motors, switch mechanism for connecting said resistances in series with each other and said motors in series with each other and in series with said resistances and for connecting said motors in parallel with each other with one of said resistances in each branch of the parallel circuit control mechanism for said resistances, connections whereby movement of said control mechanism with said motors in series relation gradually excludes the resistances from the motor circuit up to predetermined values of the resistances and whereby said switch mechanism connects said motors in parallel with the amount of each resistance previously excluded connected in a parallel motor circuit so that a return movement of said control contact mechanism gradually excludes said resistances from the parallel motor circuits, and means including a master controller movable to vary the rate of acceleration and to change the motor connections from series to parallel when the amounts of said resistances excluded from the series motor circuit are sufficient to maintain the motor currents substantially unchanged when the motor connections are changed from series to parallel.

36. In a system of motor control, a plurality of motors, a plurality of resistances for controlling said motors, switch mechanism for connecting said resistances in series with each other and said motors in series with each other and in series with said resistances and for connecting said motors in parallel with each other with one of said resistances in each branch of the parallel circuit, contact mechanism for controlling said resistances, connections whereby movement of said contact mechanism with said motors in series relation gradually excludes the resistances from the motor circuit up to predetermined values of the resistances and whereby said switch mechanism connects said motors in parallel with the amount of each resistance previously excluded connected in a parallel motor circuit so that a return movement of said contact mechanism gradually excludes said resistances from the parallel motor circuits, a pilot motor for driving said contact mechanism, controller means driven by said pilot motor for controlling the operation of said switch mechanism to change the motor connections from series to parallel in any one of a plurality of positions of said controller means and contact mechanism, a motor acceleration responsive device for controlling the speed of said pilot motor to maintain a predetermined rate of acceleration of said driving motors, a master controller movable to anyone of a plurality of positions to adjust said acceleration responsive device to maintain a selected rate of acceleration and to adjust said controller means to change said motor connections from series to parallel when the portions of said resistances excluded from the series motor circuit are sufficient to maintain the motor current substantially unchanged when the motor connections are changed from series to parallel.

37. In a system of motor control, a plurality of motors, a plurality of resistances for controlling said motors, switch mechanism including a series contactor and two bridging contactors for connecting said resistances in series with each other and said motors in series with each other and in series with said resistances and for connecting said motors in parallel with each other with one of said resistances in each branch of the parallel circuit, control mechanism for said resistances, connections whereby movement of the resistance control mechanism with the motors in series relation gradually excludes the resistances from the motor circuit and whereby said switch mechanism connects said motors in parallel with the amount of each resistance previously excluded connected in a parallel motor circuit so that a return movement of the contact mechanism gradually excludes the resistances from the parallel motor circuits, a holding circuit for the coil of said series contactor including an interlock switch normally closed when one of said bridging contactors is open but opened before said bridging contactor closes, mechanical interlock means between said series contactor and said bridging contactors preventing closure of said bridging contactors when said series contactor is closed but proviidng for sufficient closure movement of said one bridging contactor to open said interlock switch whereupon said series contactor opens and said bridging contactors close.

38. In a system of motor control, a plurality of motors, a plurality of resistances for controlling said motors, switch mechanism including a series contactor and two bridging contactors for connecting said resistances in series with each other and said motors in series with each other and in series with said resistances and for connecting said motors in parallel with each other with one of said resistances in each branch of the parallel circuit, contact mechanism for controlling said resistances, connections whereby movement of said contact mechanism with said motors in series relation gradually excludes said resistances from said motor circuit up to predetermined values of said resistances and whereby said switch mechanism connects said motors in parallel with the amount of each resistance previously excluded connected in a parallel motor circuit so that a return movement of said contact mechanism gradually excludes the resistances from the parallel motor circuits, a holding circuit for the coil of said series contactor including an interlock switch normally closed when one of said bridging contactors is open but opened before said bridging contactor closes, mechanical interlock means between said series contactor and said bridging contactors preventing closure of said bridging contactors when said series contactor is closed but providing for sufficient closure movement of said one bridging contactor to open said interlock switch whereupon said series contactor opens and said bridging contactors close, a pilot motor for driving said contact mechanism, controller means driven by said pilot motor for controlling the energizaiton of said bridging contactors to change the motor connections from series to parallel in anyone of a pluarlity of positions of said contact mechanism, a motor acceleration responsive device for controlling the speed of said pilot motor to maintain a predetermined rate of acceleration of said driving motors, and a master controller movable to anyone of a plurality of positions to adjust said acceleration responsive device to maintain a selected rate of acceleration and to select a corresponding position of said controller means in which said motor connections are changed from series to parallel.

JOHN F. TRITLE.